(12) United States Patent
Sanders (10) Patent No.: US 7,486,401 B2
(45) Date of Patent: Feb. 3, 2009

(54) LASER MEDIUM PUMPING SYSTEM FOR A GYROSCOPE

(75) Inventor: Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 255 days.

(21) Appl. No.: 11/364,025

(22) Filed: Feb. 27, 2006

(65) Prior Publication Data

US 2007/0201030 A1    Aug. 30, 2007

(51) Int. Cl.
   *G01C 19/64*    (2006.01)
(52) U.S. Cl. .................................................. 356/461
(58) Field of Classification Search ............. 356/459, 356/461; 372/6
   See application file for complete search history.

(56) References Cited

U.S. PATENT DOCUMENTS

| | | | | |
|---|---|---|---|---|
| 3,469,922 A | * | 9/1969 | Coccoli et al. | 356/459 |
| 3,772,611 A | * | 11/1973 | Smith | 356/461 |
| 4,013,365 A | * | 3/1977 | Vali et al. | 356/461 |
| 4,396,290 A | * | 8/1983 | Morris | 356/461 |
| 4,472,808 A | * | 9/1984 | Suzuki | 372/64 |
| 6,108,358 A | | 8/2000 | Albers et al. | |
| 7,245,381 B2 | * | 7/2007 | Marino et al. | 356/461 |

OTHER PUBLICATIONS

Lawrence, Modern Inertial Technology 2nd edition, Springer publishing, 1998, pp. 214.*

* cited by examiner

*Primary Examiner*—Samuel A Turner
(74) *Attorney, Agent, or Firm*—Black Lowe & Graham, PLLC (57) ABSTRACT

An apparatus for detecting rotation and a method for constructing the apparatus are provided. The apparatus comprises an optical fiber having a hollow passageway therethrough, a laser medium within the hollow passageway and interconnecting the first and second portions of the hollow passageway, and first and second electrodes contacting the laser medium such that when a voltage is applied across the first and second electrodes, the laser medium is excited such that the laser medium emits laser light through the hollow passageway.

18 Claims, 5 Drawing Sheets

LASER MEDIUM PUMPING SYSTEM FOR A GYROSCOPE

TECHNICAL FIELD

The present invention generally relates to gyroscope systems, and more particularly relates to optical gyroscopes, such as fiber optic gyroscopes and ring laser gyroscopes.

BACKGROUND

Ring laser gyroscopes (RLGs) and fiber optic gyroscopes (FOGs) have become widely used technologies in many systems to sense the rotation and angular orientation of various objects, such as aerospace vehicles. Both RLGs and FOGs work by directing light in opposite directions around a closed optical path enclosing an area whose normal is along an axis of rotation. If the device is rotated about the axis of rotation, the optical path length for the light traveling in one direction will be reduced, while the optical path length far the light traveling in the opposite direction will be increased. The change in path length causes a phase shiftbetween the two light waves that is proportional to the rate of rotation.

Generally speaking, the signal to noise sensitivity of such gyroscopes increases as the optical path lengths and diameters of the closed path are increased. In this sense, both RLGs and FOGs have an advantage in that light is directed around the axis of rotation multiple times. In RLGs, a series of mirrors is used to repeatedly reflect the light around the axis forming a high finesse resonator. In FOGs, the light travels around the axis through a coil (with numerous turns) of optical fiber, which often has a length of several kilometers.

In recent years, resonator fiber optic gyroscopes (RFOGs) have been developed which combine the above-described path length benefits of RLGs and. FOGs into a single device that uses both a recirculating element, such as a mirror or a fiber coupler, and a multi-turn optical fiber coil to form an optical resonator. The combination of the benefits of RLGs and FOGs allows RFOGs to use shorter optical fiber and to be very small. One difficulty associated with RFOGs is that phase shifts often occur that are not attributable to rotation, but rather errors due to the fact that monochromatic light is propagating in a glass medium provided by a conventional optical fiber. Additionally, besides the mirror and/or coupler and fiber coil, RFOGs typically rely on complicated optical and electronic systems to process and modulate the laser light that is directed into the resonator from an external laser or lasers, as well as process the light signal that comes out of the resonator. These electronic systems, including the external laser(s), can increase the overall size and costs of the RFOGs.

Accordingly, it is desirable to provide a gyroscope system with simplified electronic signal processing systems. In addition, it is desirable to provide a gyroscope system that does not require a separate, external laser source or multiple sources. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for detecting rotation The apparatus comprises an optical fiber having a hollow passageway therethrough, a laser medium within the hollow passageway, and first and second electrodes contacting the laser medium such that when a voltage is applied across the first and second electrodes, the laser medium is excited such that the laser medium emits laser light through the hollow passageway.

A method is provided for constructing a fiber optic gyroscope. The method comprises providing an optical fiber having an outer surface, first and second opposing ends, a central axis, and a hollow passageway therethrough, the hollow passageway having first and second portions and being symmetric about the central axis, forming first and second holes in the outer surface of the optical fiber to the hollow passageway, the first hole being adjacent to the first portion of the hollow passageway and the second hole being adjacent to the second portion of the hollow passageway, providing a laser medium in the hollow passageway, the laser medium interconnecting the first and second portions of the hollow passageway, and placing respective first and second electrodes into the first and second holes, the first electrode contacting the laser medium at the first portion of the hollow passageway and the second electrode contacting the laser medium at the second portion of the passageway such that when a voltage is applied across the first and second electrodes, the laser medium is excited such that the laser medium emits laser light through the hollow passageway.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be noted that FIGS. 1-6 are merely illustrative and may not be drawn to scale.

FIG. 1 to FIG. 6 illustrate a gyroscope system. The gyroscope system includes an optical fiber with a hollow core that contains a laser medium, such as a gaseous compound or mixture. Holes are formed in the optical fiber, which extend to the hollow core to expose the laser medium within. Electrodes are inserted into the holes to seal the hollow core and contact the laser medium. A power supply is connected to the electrodes to supply a voltage across the electrodes to thereby cause a discharge that excites the laser gain medium and therefore creates laser light within the optical fiber.

Figure 1:
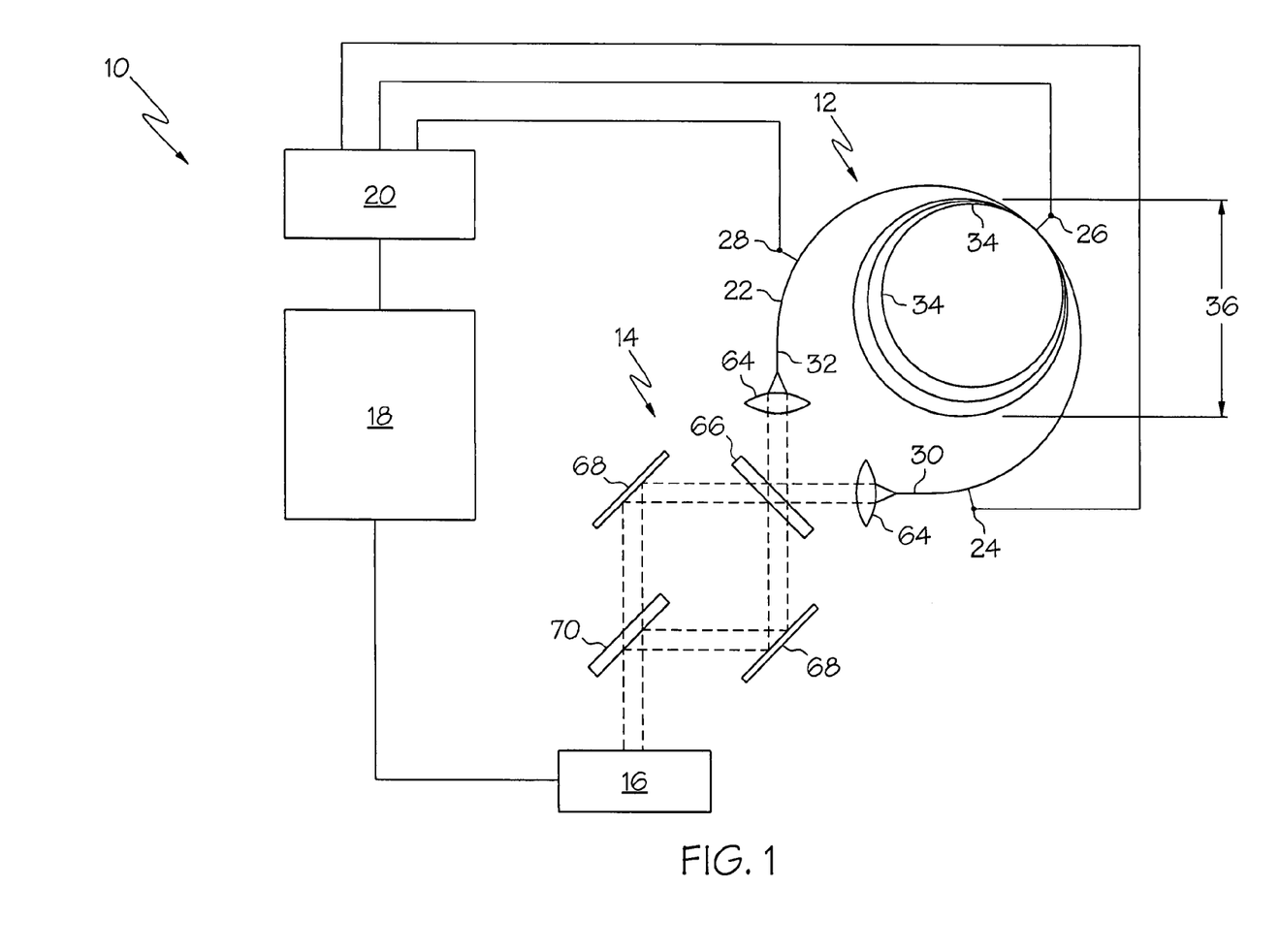
FIG. 1 is a schematic view of a fiber optic gyroscope system according to one embodiment of the present invention including an optical fiber assembly and an optics sub-system.

FIG. 1 illustrates a gyroscope system 10 according to one embodiment of the present invention. The gyroscope system 10 includes an optical fiber assembly 12, an, optics subsystem 14, a photodetector 16, a processor/controller 18, and a power supply 20. As will be described in greater detail below, the system 10 may be implemented as either a type of ring laser gyro (RLG), a type of resonator fiber optic gyro (RFOG), or a combination or hybrid of both an RLG and a RFOG, as will be appreciated by one skilled in the art.

The optical fiber assembly 12 includes an optical fiber 22 and three electrodes 24, 26, and 28. As illustrated in FIG. 1, the optical fiber 22 has a first end 30 and a second end 32, each being directed toward the optics subsystem 14. As is discussed in greater detail below, a highly reflective mirror 66 in the optical subsystem is positioned to receive the light from fiber end 30 and reflect a large majority of the light emitted from fiber end 30 into fiber end 32, thus forming a resonant cavity for light traveling in the clockwise (CW) direction. Likewise, the mirror 66 is positioned to reflect a large majority of the light exiting fiber end 32 into fiber 30, thus forming a resonant cavity in the counterclockwise (CCW) direction. Lenses 64 may be used to collimate or spatially condition the light to minimize fiber-end to fiber-end optical losses. The fiber 22, the mirror 66, and the lenses form an optical ring-resonator which has resonant frequencies in the CW and CCW directions determined by the roundtrip optical pathlength inside the resonator path in each direction, respectively. In the presence of rotation about an axis perpendicular to the plane of the resonator path, the pathlengths will not be the same, and the resonance frequency of the CW and CCW directions will be different, with the difference proportional to the rotation rate magnitude. When the gain medium is excited and lasing occurs, the laser frequencies in the CW and CCW directions are shifted from each other, proportionally to the rotation rate.

Referring again to FIG. 1, a central portion of the optical fiber 22 is wound, or arranged, in a coil 34 having an outer diameter 36 of, for example, less than 3 cm with between 20 and 40 turns. In one embodiment, the outer diameter 36 is approximately 1 cm. Although not illustrated, the coil 34 is formed around an axis of rotation, as is commonly understood.

Figure 2:
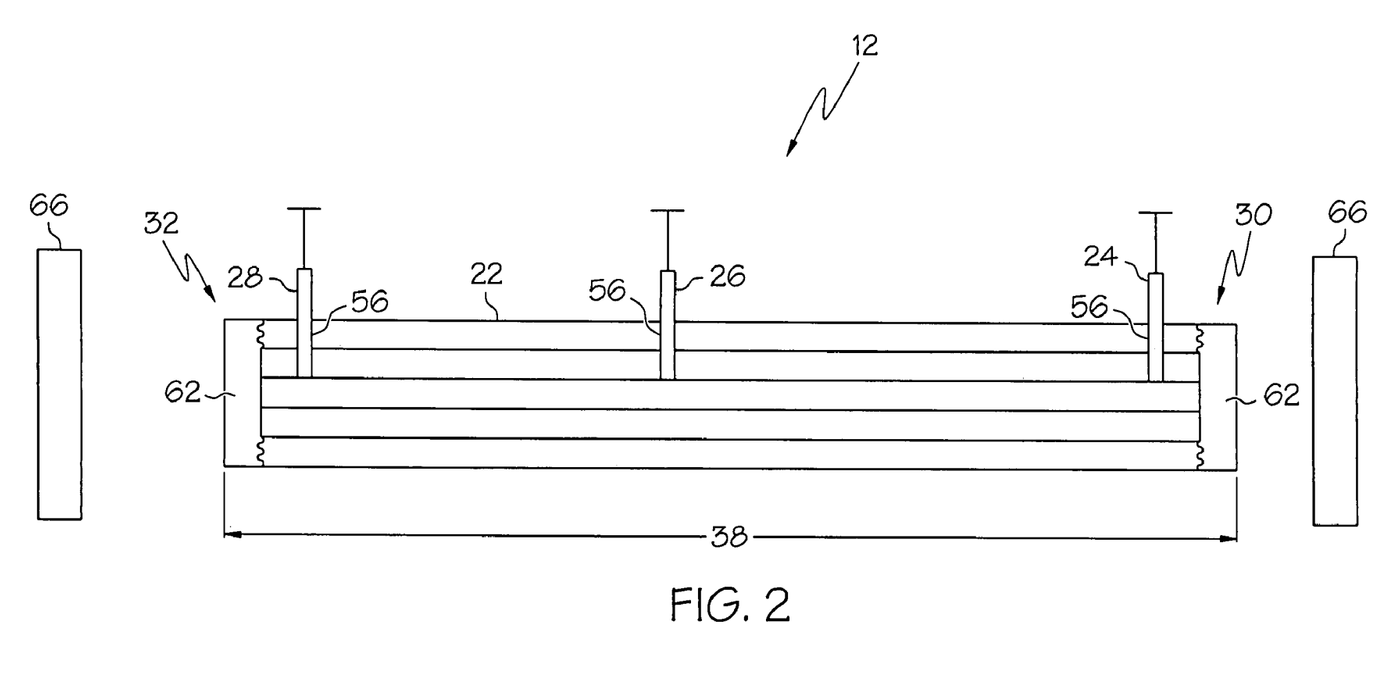
FIG. 2 is a cross-sectional schematic view of the optical fiber assembly illustrated in FIG. 1.
Figure 3:
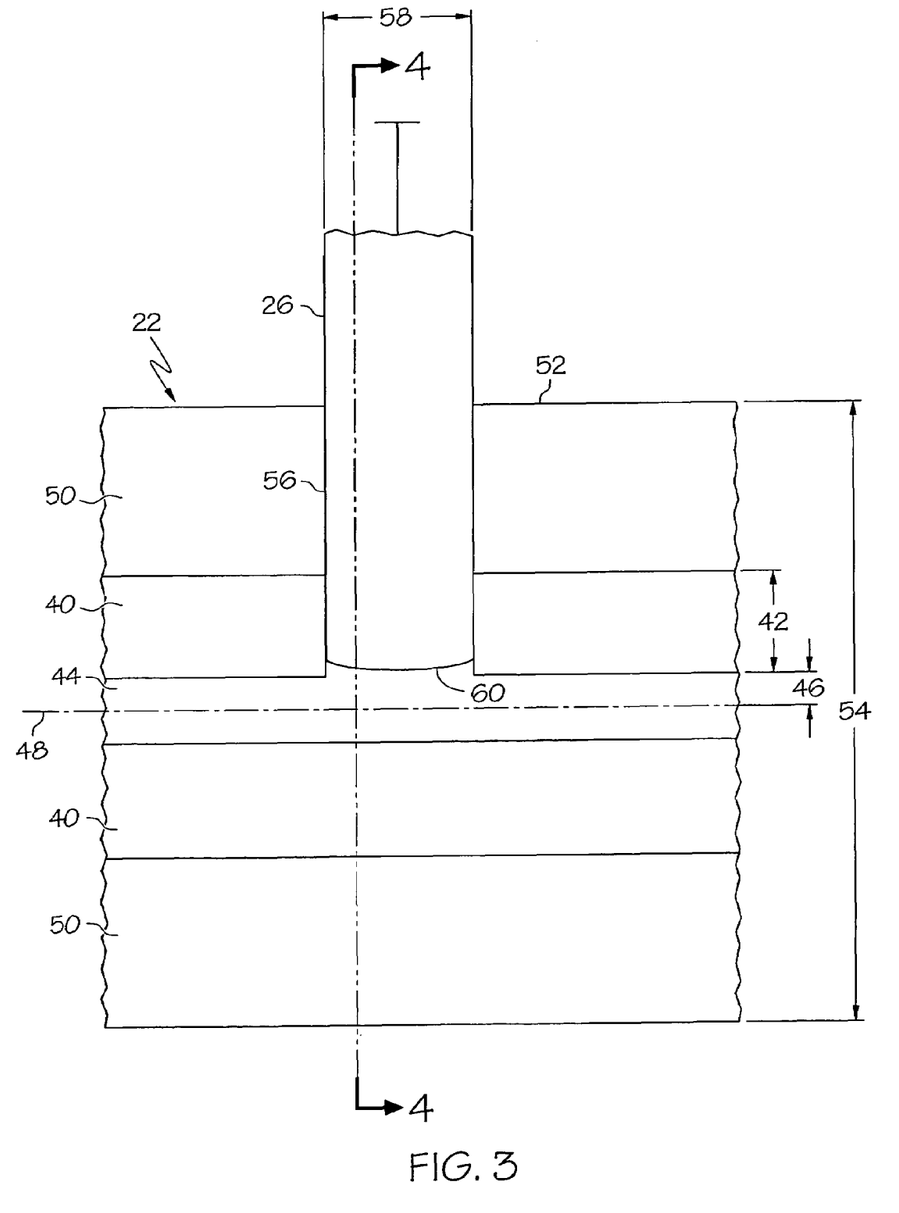
FIG. 3 is a cross-sectional schematic view of a portion of the optical fiber assembly illustrated in FIG. 2.
Figure 4:
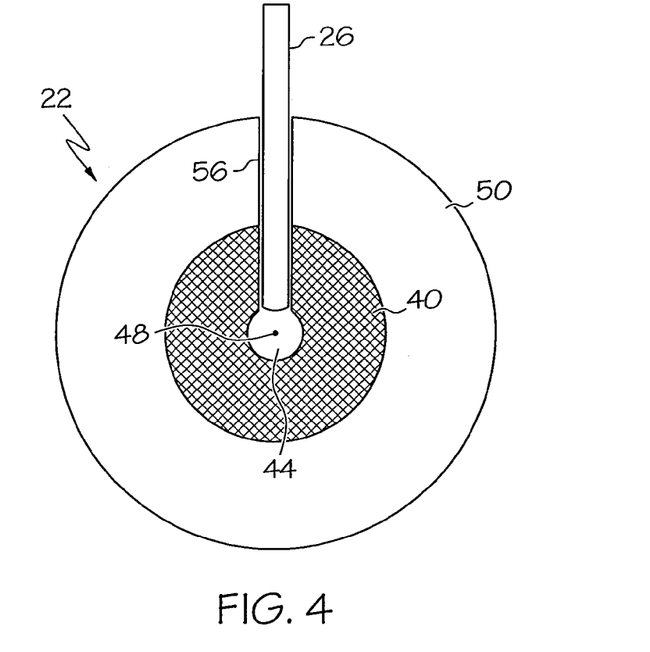
FIG. 4 is a cross-sectional view of the portion of the optical fiber assembly illustrated in FIG. 3 taken along line 4-4.

FIG. 2 schematically illustrates the optical fiber assembly 12 in greater detail with the optical fiber 22 being shown un-wound. The optical fiber 22 may have a length 38 of greater than 1 m and be substantially symmetric about a mid-point thereof. In one embodiment, the length 38 of the optical fiber 22 is approximately 1.25 m. The optical fiber 22 is, in a preferred embodiment, a glass-based, hollow core, band-gap, optical fiber with an extremely low bend loss. Referring to FIGS. 3 and 4, the optical fiber 22 includes a region 40 of periodic photonic crystal cells, having a thickness 42 of, for example, between 30 and 40 microns, around a central passageway 44 (i.e., hollow core). The central passageway 44 has a radius 46 of, for example, between 2.5 and 10 microns and extends in a direction parallel to, and is symmetric about, a central axis 48 of the optical fiber 22. The optical fiber 22 also has an outer glass layer 50 which forms an outer surface 52 of the optical fiber 22. The optical fiber 22, in one embodiment, has an overall diameter 54 of between 100 and 125 microns.

Referring to FIG. 2 in combination with FIGS. 3 and 4, the electrodes 24, 26, and 28 are inserted into holes 56 which lie respectively near the first end 30, a central portion (e.g., the mid-point), and the second end 32 of the optical fiber 22. Although FIGS. 3 and 4 only specifically illustrated electrode 26, it should be understood that electrodes 24 and 28 may be connected to the optical fiber 22 in a similar fashion. In the embodiment shown, a distance between adjacent electrodes, as measured along the optical fiber 22, may be approximately 0.6125 m (i.e., half the length of the optical fiber 22). The holes 56 extend through the glass layer 50 and the periodic photonic crystal cell region 40 to expose the central passageway 44. The holes 56 may have widths 58 of, for example, between 5 and 20 microns or larger and may be formed using a carbon dioxide laser, as is commonly understood. In the embodiment shown, the electrodes 24, 26, and 28 are pins with widths similar to the widths 58 of the holes to form a seal over the central passageway 44. Referring specifically to FIG. 3, a lower surface 60 of the electrodes 24, 26, and 28 lies a distance away from the central axis 48 of the optical fiber 22 that is greater than the radius 46 of the central passageway 44 so that the electrodes 24, 26, and 28 do not protrude into the central passageway 44. As shown in FIG. 4, the holes 56, and thus the electrodes 24, 26, and 28, extend into the optical fiber 22 in a direction that is substantially perpendicular to the central axis 48.

Although not specifically illustrated, a laser (or gain) medium may be formed in, or injected into, the central passageway 44. The laser medium may have an index of refraction such that light propagates in nearly free space. Therefore, environmental changes will have virtually no effect on the way light propagates through the gain medium. The laser medium may be a low pressure gaseous compound, such as helium neon (HeNe) or a mixture of gases. Referring again to FIGS. 2 and 3, the electrodes 24, 26, and 28 contact the laser medium at different portions of the central passageway and prevent the laser medium from leaking from the optical fiber 22 through the holes 56. Additionally, referring to FIG. 2, end caps 62 may be added to the first end 30 and the second end 32 of the optical fiber 22 to prevent the laser medium from leaking from the ends 30 and 32. Although not specifically illustrated, the end caps 62 may be angled at Brewster's Angle to eliminate losses and reflections, as is commonly understood, or there may be a tapered region in the endcap to prevent Fresnel-reflection losses.

Referring again to FIG. 1, the optics sub-system 14 includes lenses 64, a recirculator 66, mirrors 68, and a beam splitter 70. Although not specifically illustrated, the lenses 64 are each positioned near a respective end of the optical fiber 22 with a central axis thereof congruent to the central axis 48 of the optical fiber 22 shown in FIGS. 3 and 4. The recirculator 66 is a mirror with a very high reflectivity (e.g., above 95%) and a non-zero transmittance. As is commonly understood, the recirculator 66 may have a reflectivity for a desired state of polarization of light that is significantly higher than the reflectivity for the state of polarization of light that is orthogonal to the desired state of polarization of light. The recirculator 66 positioned on a side of both lenses 64 directly opposing the ends 30 and 32 of the optical fiber 22 and oriented at an angle to both ends 30 and 32. This angle may be chosen, in combination with a design of the mirror, to provide high loss for one polarization state, while providing low loss for the other. This enhances the ability for the laser to emit at a single frequency in each direction. As is commonly understood, the optical fiber 22 and the recirculator 66 may jointly form an optical resonator.

The mirrors 68 are positioned to receive light that is transmitted from the resonator in each direction respectively. Light from the ring laser resonator is transmitted through the recirculator 66 for the purposes of reading out the rotation-signal information. The mirrors 68 are positioned to receive light from the resonator output in the two directions respectively direct the two light beams to be recombined, or interfered via beam splitter 70, which in this case, acts as a beam combiner.

Still referring to FIG. 1, the photodetector 16 is positioned on a side of the beam splitter 70 to receive combined light waves from the beam splitter 70 and the photodetector 16 includes a photodiode, as in commonly understood. The processor/controller 18 is in operable communication with the photodetector 16 and the power supply 20 and may include electronic components, including various circuitry and integrated circuits, such as an Application Specific Integration Circuit (ASIC) and/or instructions stored on a computer readable medium to be carried out by a computing system and perform the methods and processes described below. As shown, the power supply 20 is electrically connected to the electrodes 24, 26, and 28 and although illustrated as a separate component, may be implemented as part of the processor/controller 18. Although not depicted explicitly in FIG. 1 the power supply 20 also supplies energy to the photodetector 16, either directly, or via the processor/controller 18.

During operation, referring to FIGS. 1 and 2, the power supply 20 supplies a voltage across electrode 26 and electrodes 24 and 28 so that a plasma discharge current runs from electrode 26 (i.e., anode), through the laser medium within the central passageway 44, and into electrodes 24 and 28 (i.e., cathodes). As will be appreciated by one skilled in the art, a plasma discharge in the laser gain medium excites atomic and molecular transitions in the gain medium of the laser, and thus stimulates release of photons. Thus, laser light is generated within the central passageway 44 and propagates in both directions through the optical fiber 22. That is, a first portion of the light propagates in the CW direction through the coil 34 towards the first end 30 of the optical fiber 22, and a second portion of the light propagates in the CCW direction through the coil towards the second end 32 of the optical fiber 22. The electrodes are arranged to ensure that particle flow due to the plasma discharge from electrode 26 to electrode 28 is equal and opposite to that from electrode 24 to electrode 28, thus reducing or eliminating Fresnel-drag effects, as are well-known in the art.

Figure 5:
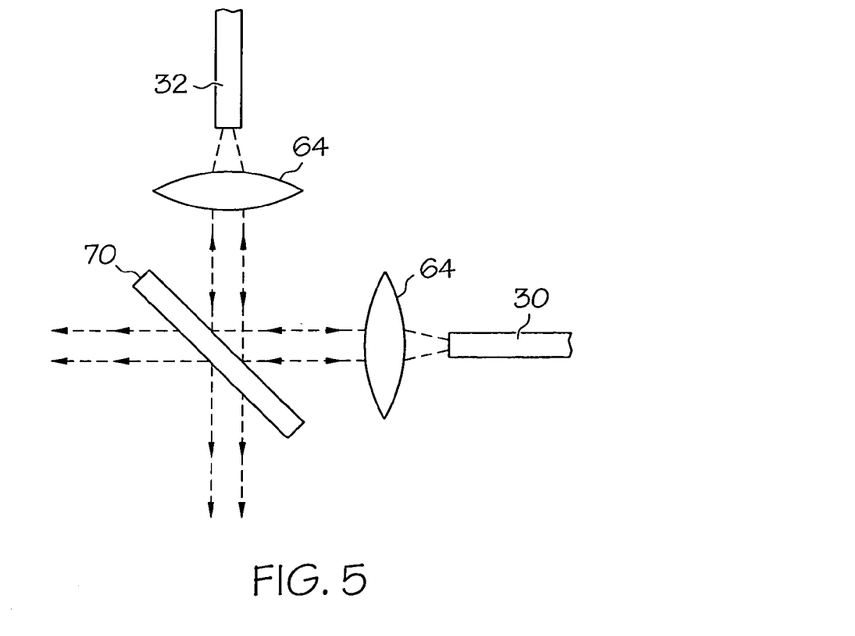
FIG. 5 is a top plan view of a portion of the optical fiber assembly and the optics sub-system illustrated in FIG. 1.

FIG. 5 illustrates the ends 30 and 32 as the light exits the optical fiber 22. As the first portion of light exits the first end 30 of the optical fiber 22, the light wave spatially diverges in transitioning from propagation in the fiber to free space, and thus "fans out," as shown. However, as the light passes through the lens 64, it becomes collimated. The collimated light strikes the recirculator 66, and because of the high reflectivity of the recirculator 66, the majority of the light is reflected towards the second end 32 of the optical fiber 22. As the collimated light passes through the lens 64, it becomes re-focused before entering the second end 32 of the optical fiber 22. Likewise, the second portion of light exits the second end 32 of the optical fiber 22 and is collimated by the first lens 64 through which it passes. As with the first portion of light, the majority of the second portion of light is reflected by the recirculator 66 towards the first end 30 and refocused by the second lens 64 through which it passes before entering the first end 30 of the optical fiber 22. This process is continually repeated as the light circulating through the optical fiber 22 resonates within the resonator path, which is comprised of path inside the optical fiber 22 and the optical path from fiber end 30 to the recirculator 66 to fiber end 32.

Still referring to FIG. 5, as previously suggested, not all of the first and second portions of light are reflected by the recirculator 66, as a relatively small portion of each passes through (i.e., is transmitted) the recirculator 66. As shown in FIG. 1, the light that passes through the recirculator 66 is directed by the mirrors 68 and the beam splitter 70 onto the photodetector 16. As will be appreciated by one skilled in the art, the photodetector 16 is capable of detecting any relative phase shifts or frequency differences in the two light beams as caused by any rotation of the system 10 about the axis of rotation of the coil 34. The photodetector 16 sends an electrical signal to the processor/controller 18 which processes the signal and determines the rate of rotation of the system 10. It is further noted that, while not shown in FIG. 1, that errors in rotation rate measurement may arise because of light that is backscattered inside the resonator from one beam into the other, and vice versa. One solution that is commonly used in conventional ring laser gyros (not using hollow core fibers) is to mechanically dither the gyro about its axis of rotation, and to add a degree of randomization of the amplitude of the dither. In this way, errors, sometimes known as lockin, may be greatly reduced or substantially eliminated. This may be similarly employed in embodiments of the present invention.

One advantage of the gyroscope system described above is that because the light is generated within the optical fiber, the optical and electronic systems external to the resonator may be simplified. Another advantage is that it eliminates rotation rate errors that may stem from signal processing steps that might otherwise be used to derive the rotation signal if the laser light was not generated in resonator, i.e., if it was a passive resonator.

Figure 6:
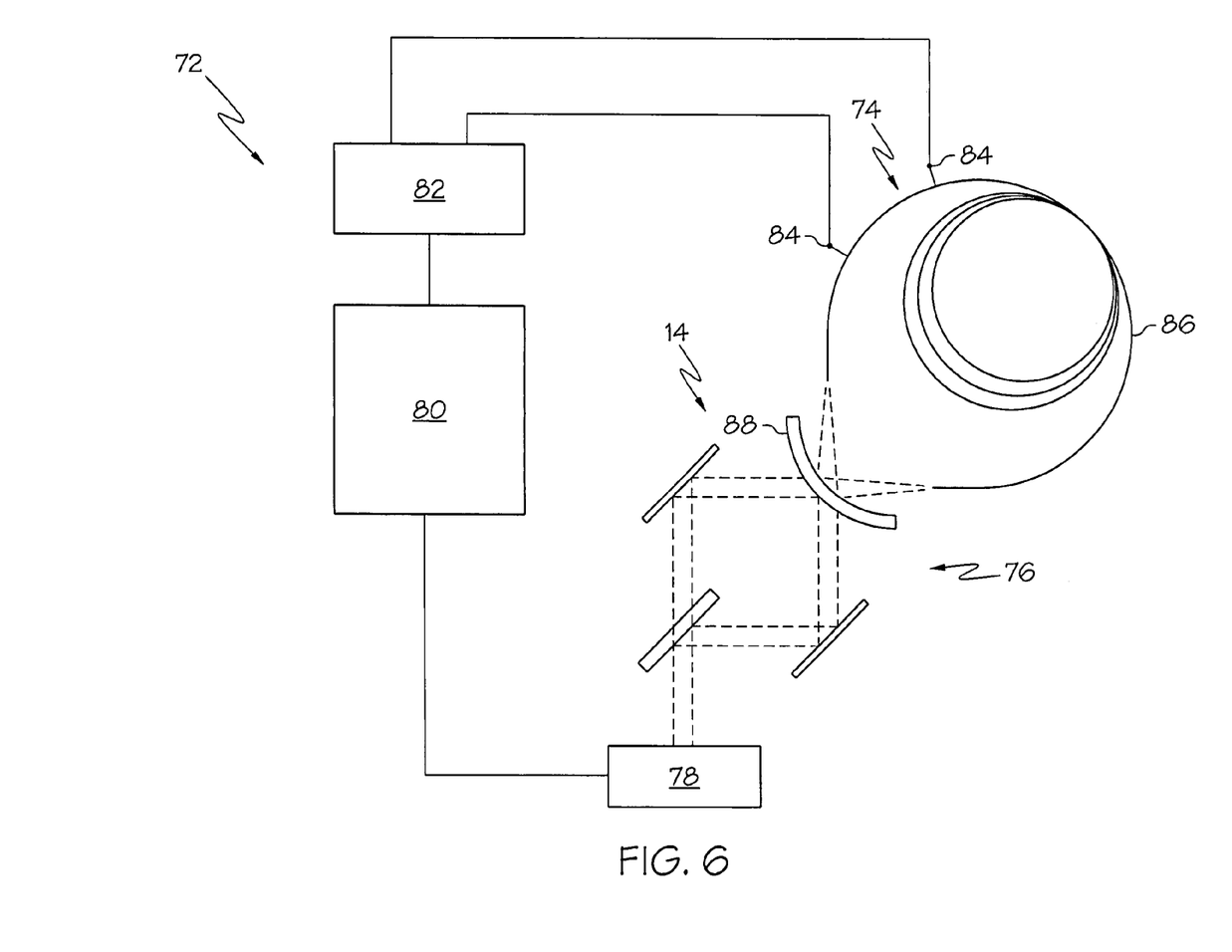
FIG. 6 is a schematic view of a fiber optic gyroscope system according to another embodiment of the present invention.

FIG. 6 illustrates a gyroscope system 72 according to another embodiment of the present invention. The gyroscope system 72 includes an optical fiber assembly 74, an optics sub-system 76, a photodetector 78, a processor/controller 80, and a power supply 82. The system 72 may be in many respects similar to the system 10 shown in FIG. 1. However, in the embodiment illustrated in FIG. 1, the optical fiber assembly 74 includes only two electrodes 84 connected to an optical fiber 86. Additionally, the distance between the electrodes 84 (as measured along the optical fiber 86) has been reduced to facilitate in the lasing of the laser medium within the optical fiber 86. As will be appreciated by one skilled in the art, this distance may be varied, along with the voltage applied across the electrodes 84, depending on the amount (i.e., concentration or density) and type of the laser medium within the optical fiber 86. Further, a third electrode could be added at an equal distance to the middle one as in FIG. 1, so that the flow induced by the plasma discharge may be counterbalanced, as it is in FIG. 1.

Additionally, in the embodiment shown in FIG. 6, the recirculator 70 and the lenses 64, shown in FIG. 1, have been replaced by a concave recirculator 88. The concave recirculator 88 may the same high reflectivity as the recirculator 66 shown in FIG. 1. However, because of the shape of the concave recirculator 88, light that is reflected by the concave recirculator 88 is re-focused before re-entering the optical fiber 86. Thus, a further advantage of the embodiment illustrated in FIG. 6 is that the light can be recirculated without the use of lens, which further simplifies and reduces the cost of the system 72, and reduces errors that may be caused by environment influences and non-linearities in the glass medium of the lenses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in anyway. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus comprising:
   an optical fiber having a hollow passageway therethrough;
   a laser medium within the hollow passageway;
   a first electrode in contact with the laser medium within the hollow passageway;
   second and third electrodes arranged in a symmetric relationship with the first electrode, the second and third electrodes in contact with the laser medium within the hollow passageway such that when a voltage is applied across the first and second electrodes and across the first and third electrodes a plasma discharge current runs through the laser medium such that the laser medium emits laser light propagating in opposite directions away from the first electrode through the hollow passageway; and
   a recirculator wherein the optical fiber includes first and second opposing ends positioned such that at least some of the laser light propagating toward the first end is reflected by the recirculator into the second end of the optical fiber and at least some of the laser light propagating from the second end is reflected by the recirculator into the first end.

2. The apparatus of claim 1, wherein the optical fiber is arranged in a coil.

3. The apparatus of claim 2, wherein the optical fiber has a length of at least 1 m and the coil has an outer diameter of less than 3 cm.

4. The apparatus of claim 1, wherein the hollow passageway extends in a direction that is parallel to a central axis of the optical fiber.

5. The apparatus of claim 1, wherein the hollow passageway is symmetric about the central axis of the optical fiber.

6. The apparatus of claim 1, wherein the hollow passageway is a hollow core and the laser medium includes a gaseous compound.

7. The apparatus of claim 1, wherein the first, second and third electrodes are pins.

8. The apparatus of claim 1, wherein the laser light propagating in opposite directions away from the first electrode through the hollow passageway includes a first portion of the laser light propagating through the optical fiber in a clockwise direction and a second portion of the laser light propagating through the optical fiber in a counterclockwise direction.

9. The apparatus of claim 1, further comprising a photodetector wherein at least some of the laser light is captured by the photo detector.

10. A fiber optic gyroscope comprising:
    an optical fiber arranged in a coil and having first and second opposing ends, a central axis, and a hollow passageway therethrough, the passageway having first and second portions and being symmetric about the central axis;
    a laser medium within the hollow passageway and interconnecting the first and second portions of the hollow passageway;
    first, second and third electrodes contacting the laser medium at respective portions of the hollow passageway, the first electrode located equidistant from the second and third electrodes;
    a power supply electrically connected to the electrodes such that when a voltage is applied across the first and second electrodes and across the first and third electrodes, the laser medium is excited such that the laser medium emits laser light through the hollow passageway, a first portion of the light propagating through the coil in a clockwise direction and a second portion of the light propagating through the coil in a counterclockwise direction; and
    a recirculator having a surface positioned such that at least some of the first portion of light propagates from the first end of the optical fiber and is reflected by the surface into the second end of the optical fiber and at least some of the second portion of light propagates from the second end of the optical fiber and is reflected by the surface into the first end of the optical fiber.

11. The fiber optic gyroscope of claim 10, further comprising a photodetector and wherein at least some of the first portion of light and at least some of the second portion of light are transmitted by the recirculator and are received by the photodetector.

12. The fiber optic gyroscope of claim 11, wherein the hollow passageway is a hollow core and the laser medium includes at least one of a gaseous compound and a mixture of gases.

13. The fiber optic gyroscope of claim 12, wherein the optical fiber has a length of at least 1 m and the coil has a diameter of less than 3 cm.

14. The fiber optic gyroscope of claim 12, wherein the first and second electrodes are pins and the first electrode is an anode and the second electrode is a cathode.

15. The fiber optic gyroscope of claim 14, wherein the hollow core has a radius and the pins are located a distance away from the central axis of the optical fiber, the distance being greater than the radius.

16. A method for constructing a fiber optic gyroscope comprising:
    providing an optical fiber having an outer surface, first and second opposing ends, a central axis, and a hollow passageway therethrough, the hollow passageway having first and second portions and being symmetric about the central axis;
    forming first, second and third holes in the outer surface of the optical fiber and the holes extending through to the hollow passageway, the first hole spaced apart from and located substantially equidistant from the second and third holes;
    providing a laser medium in the hollow passageway, the laser medium in fluid communication with the holes; and
    placing first, second and third electrodes into the first, second and third holes, respectively, such that the electrodes are in contact with the laser medium within the hollow passageway such that when a voltage is applied across the first and second electrodes and across the first and third electrodes, the laser medium is excited such that the laser medium emits laser light through the hollow passageway in opposite directions relative to the location of the first electrode,
    wherein a first portion of the light propagates through the coil in a Clockwise direction and a second portion of the light propagates through the coil in a counterclockwise direction and further comprising positioning a recirculator such that at least some of the first portion of light propagates from the first end of the optical fiber and is reflected by the recirculator into the second end of the optical fiber and at least some of the second portion of light propagates from the second end of the optical fiber and is reflected by the recirculator into the first end of the optical fiber.

17. The method of claim 16, further comprising arranging the optical fiber in a coil and wherein the optical fiber has a length of at least 1 m and the coil has an outer diameter of less than 3 cm.

18. The method of claim 16, further comprising positioning a photo detector such that at least some of the laser light is transmitted by the recirculator and received by the photodetector.

* * * * *